UNITED STATES PATENT OFFICE.

JOHN G. PEW AND HOWELL C. COOPER, OF PITTSBURGH, PENNSYLVANIA.

DIFFERENTIAL-PRESSURE RECORDER.

1,058,092.   Specification of Letters Patent.   Patented Apr. 8, 1913.

Application filed January 15, 1912. Serial No. 671,223.

*To all whom it may concern:*

Be it known that we, JOHN G. PEW and HOWELL C. COOPER, residing at Pittsburgh, in the county of Allegheny and State of Pennsylvania, citizens of the United States, have invented or discovered certain new and useful Improvements in Differential-Pressure Recorders, of which improvement the following is a specification.

The object of the invention, described herein, is to provide means whereby the volume of a body of gas flowing through a conduit may be accurately determined.

Figure 1:
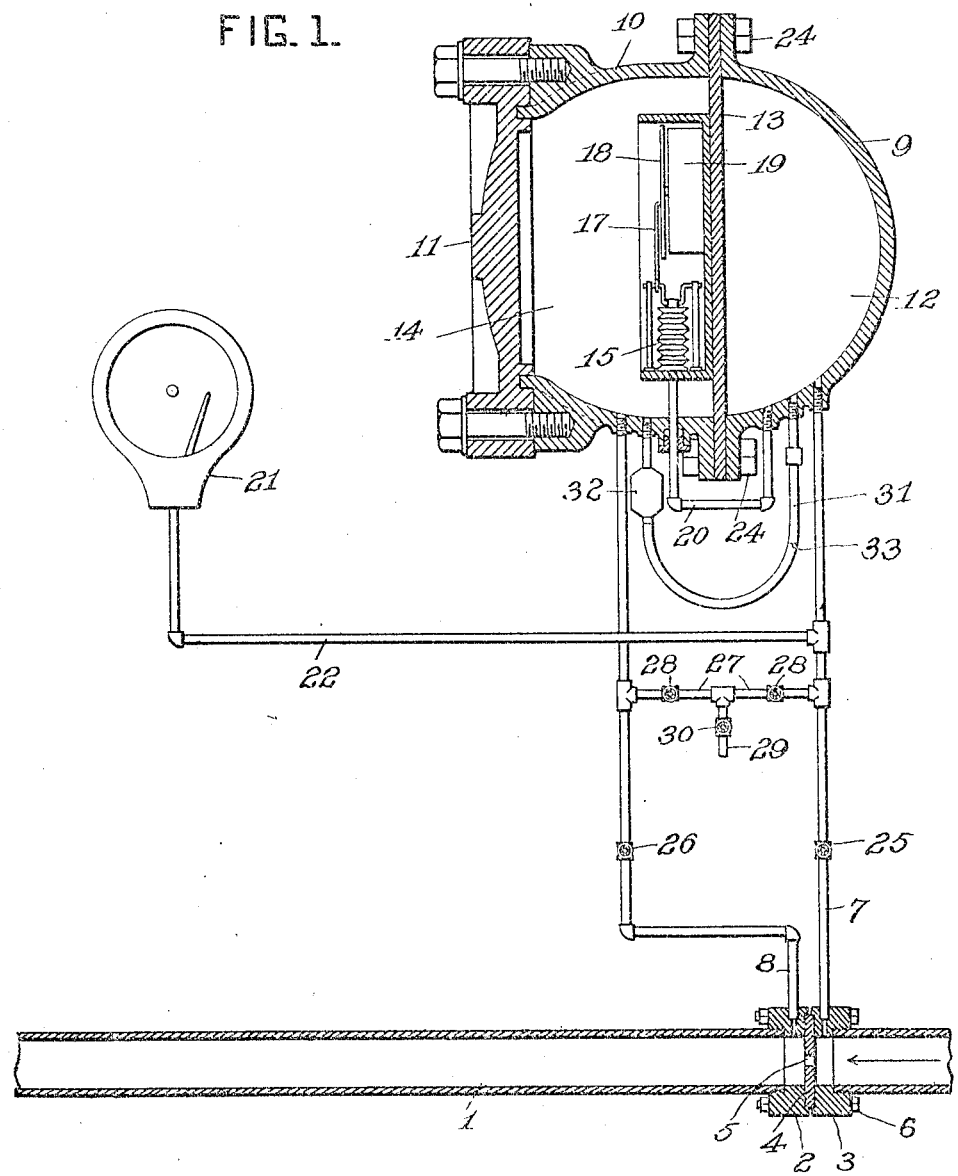
Figure 2:
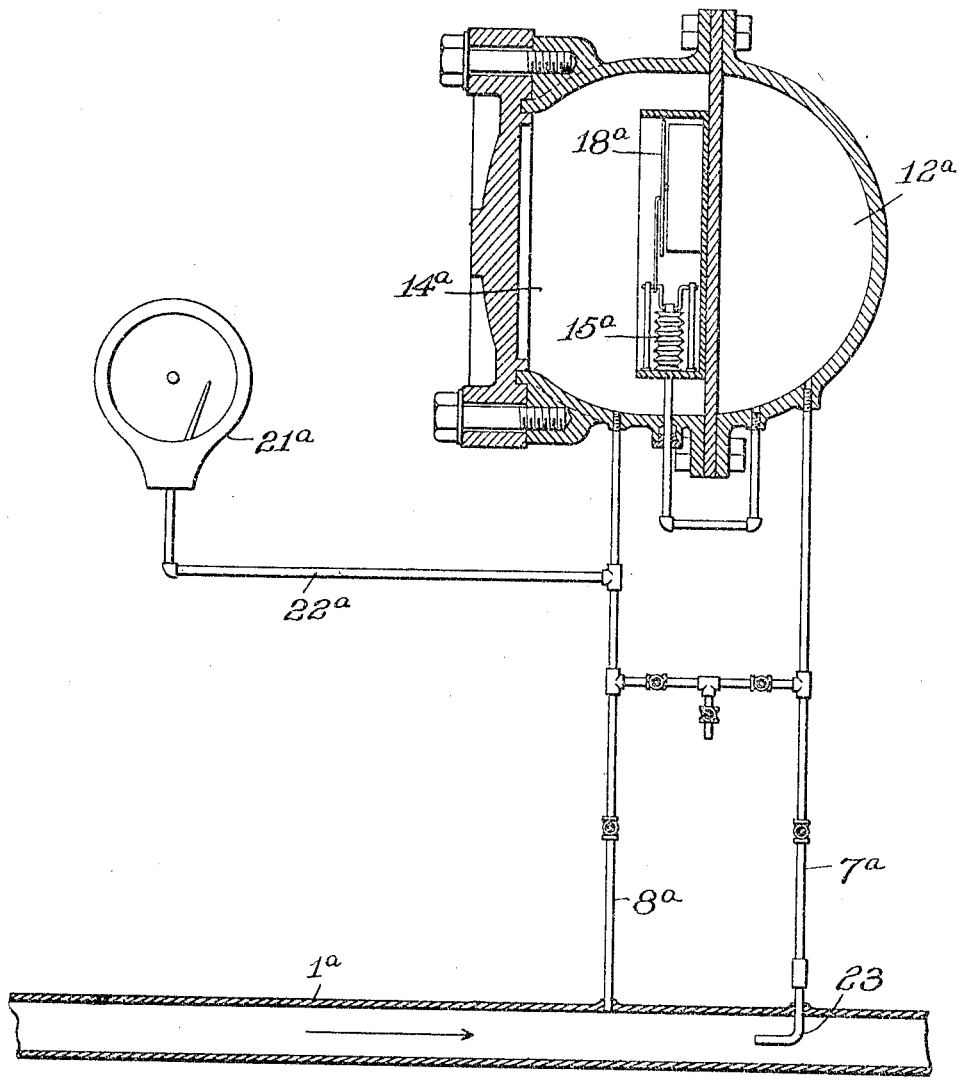

In the accompanying drawing, which forms part of the specification, and in which the invention is illustrated, Figure 1 shows, in elevation, the preferred embodiment of the invention, and in this figure a conduit and pressure recorder are shown in section; and Fig. 2 shows, in a similar manner, an alternate form of the invention.

In the practice of the invention, a gas-conduit 1 has connected thereto a pressure-recording device in such a manner as to record the difference in the pressures of the gas, such difference being caused by the gas flowing through the conduit.

In the preferred form of the invention the gas pipe 1 is provided with a transverse orificed-abutment. In order to have gas flow through the orifice of the abutment, the static pressure of the gas on the down-stream side of the abutment must be less than that on the up-stream side; and, it will be understood, that the amount of gas flowing through the orifice will be proportional to the square of such difference in static pressure, provided the gas on the up-stream side of the abutment remains at a constant pressure. Such a means for measuring the volume of a body of flowing gas is illustrated in Fig. 1. The conduit may be divided at a point where it is desirable to measure the volume of the gas flowing therethrough. Suitable internally - threaded shouldered flanges 2, 3 may be secured, one to each end of the divided conduit; and an abutment or disk 4, having an orifice 5 of known cross-sectional area, may be clamped between the said flanges, as by bolts 6. Pipes 7 and 8 may be connected at one end to the right and left side respectively of the abutment 4, and at the other ends to a suitable differential pressure recorder. As shown herein, the pipes 7 and 8 are preferably secured in suitably provided holes in the flanges 2, 3.

The pressure recorder which is preferably used, consists of a casing 9, 10, 11 inclosing within its walls three chambers. The chamber 12 may be formed of the casing-portion 9 and the partition 13; the chamber 14 may be formed of the casing-portions 10, 11 and the partition 13; and the chamber 15, placed within the chamber 14 is preferably the expansible chamber of what is commonly known as a Bristol recording gage. Such a recording gage consists of the said expansible chamber 15 adapted to expand by the pressure of a fluid contained therein acting against the resistance of the said chamber and whatever pressure there may be in the medium surrounding the said chamber. As the said chamber 15 expands, it moves upward, and by such movement causes a pencil-provided indicator hand 17 to move over the face of, and trace a line upon, a dial 18, which may be uniformly moved, as by a clockwork 19. In the construction shown herein the said expansible chamber 15 is connected, as by pipe 20, to the gas chamber 12. Furthermore the chambers 12 and 14 are of such size as to deaden the effect of small and frequent variation in the static pressure of the gas flowing through the conduit.

The casing parts 9 and 10 may be suitably united by bolts 24, and the lid or cover 11 may be removably secured to the casing portion 10, to the end that access may be had to the pressure recorder. The pipes 7 and 8 may be provided with valves 25 and 26, so that communication between the conduit 1 and the chambers 12 and 14 may be closed at such times as may be desirable. Also the pipes 7 and 8 may be connected by a pipe 27, provided with valves 28 and with a branch valve-controlled pipe 29.

In the operation of the invention as thus far described, gas from the right of the abutment 4 flows through the pipe 7 and fills the chamber 12, the static pressure of such gas being the same as that in the pipe 1 to the right of the said abutment. Also gas from the left of the said abutment will flow through the pipe 8 and will fill the chamber 14 with gas at the same static pressure as the gas in the conduit 1 to the left of the said abutment. The expansible chamber 15 being connected to the chamber 12, gas from the last named chamber will flow into the chamber 15 at such times as the pressure in chamber 12 is greater than that in chamber 14. Such difference in pressures between the gas in the chambers 14 and 15 will cause the latter chamber to expand in proportion to the said difference in pressures. The movement of the said expansible chamber will, as described, cause the indicator hand 17 to trace, in a manner well understood by those skilled in the art, a line upon the uniformly moving dial 18. Such a line will indicate the continuous or varying difference in pressures of the gas to the right and left of the abutment 4; so that, knowing the cross-sectional area of the orifice 5 the volume of gas flowing therethrough for any given period may be computed. When it becomes desirable to remove the cover 11, as for changing the recording dial, the valves 25 and 26 are closed and the valves 28 are opened in order to equalize the pressures in the chambers 12, 14 and 15. The valve 30 of the pipe 29 may then be opened to relieve the pressure in the said chambers and the cover 11 may then be readily removed.

Such being the operation of the preferred form of our invention as thus far described, we will now proceed to describe additional features of the invention and the modification thereof.

Inasmuch as the feed pressure, that is, the absolute static pressure of the gas to the right of the abutment, may vary, a second pressure recorder 21 may be provided to record, in relation to atmospheric pressure, the gas pressure to the right of the abutment 4, such a record being taken simultaneously with the differential gas pressure record, heretofore described. As shown herein, this second recorder 21 may be of the Bristol type and is preferably connected, as by pipe 22 to the pipe 7. It will be understood that such a record will give the variations in the absolute pressure of the gas to the right of the abutment 4, and that such data may be used in computing the volumetric flow of gas when its absolute pressure varies. Furthermore, in order to avoid breaking the expansible chamber 15, or otherwise rendering the recorder inoperative, when (by reason of an emergency) the difference in pressure of gas above and below the abutment 4 is greater than may be recorded by the particular instrument used, means are provided to reduce such excessive difference in pressure. Preferably such a pressure reducing means consists of an automatically restorable seal extending between the chambers 12 and 14. Referring particularly to Fig. 1, a U-shaped tube 31 may connect the chambers 12 and 14, as shown, the tube lying substantially in a vertical plane and provided with an enlarged reservoir portion 32. A suitable quantity of liquid, such as mercury, may be placed in the said tube 31, as is indicated at 33, to the end that, when the gas pressure in the chamber 12 exceeds that in the chamber 14 to such a degree that the recording instrument may be injured, the fluid 33 will be blown out of the tube 31 and into the reservoir 32, which has sufficient capacity to contain all the said fluid and permit the higher pressure gas to blow therethrough, thus reducing the difference in pressures between the said chambers 12 and 14. It will be understood of this construction that, when the normal difference in pressures has been restored the liquid will return to the tube 31 and thus form an effective seal against the further flow of gas from the chamber 12 through the tube 31 and into the chamber 14.

In the form of the invention shown in Fig. 2, the differential pressure recorder is arranged to record the difference between the sum of the static and dynamic pressures and the static pressure alone of a body of gas flowing through a pipe of known cross sectional area. To such an end a Pitot tube 23 may be suitably connected to the conduit 1ª, the tube opening in the direction opposed to the flow of gas through the said conduit; and pipes 7ª and 8ª may be connected at their lower ends to the Pitot tube 23 and the conduit 1ª, respectively, and at their upper ends to the chambers 12ª and 14ª of a differential recorder, constructed the same as heretofore described. In this construction the gas within the chambers 12ª and 15ª will, when gas is flowing through the conduit 1ª, be at a greater pressure than the gas in the chamber 14ª, the difference in pressures being proportional to the square of the velocity of flow through the said conduit, as is well understood by those skilled in the art. Furthermore, the chamber 15ª will expand as heretofore described, and a record of the varying or constant differential pressure will be made upon the dial. In order to obtain a record of whatever variations there may be in the absolute static pressure of the gas flowing through the pipe 1ª, a second recording instrument 21ª may be connected as by pipe 22ª to the pipe 8ª, the operation of such a recorder being the same as that described in connection with the recorder 21, shown in Fig. 1.

We do not wish to limit ourselves to the details of construction shown and described herein, for obviously many changes may be made by those skilled in the art without departing from the spirit of our invention.

We claim as our invention:

In an instrument for determining the volumetric flow of a gas in a conduit, the combination of a shell or case divided into two chambers by a partition, an expansible chamber in one of said chambers communicating with the other of the two said chambers, connections from the conduit to each of the said chambers within the casing, an indicator hand within the said shell secured to said expansible chamber, and a dial within the said shell movable with relation to said hand, substantially as described.

In testimony whereof we have hereunto set our hands.

JOHN G. PEW.
HOWELL C. COOPER.

Witnesses:
   PAUL N. CRITCHLOW,
   FRANCIS J. TOMASSON.